US011796387B2

United States Patent
Fujiwara et al.

(10) Patent No.: US 11,796,387 B2
(45) Date of Patent: Oct. 24, 2023

(54) PYROELECTRIC-TYPE INFRARED DETECTOR AND INTEGRATED CIRCUIT

(71) Applicant: NIPPON CERAMIC CO., LTD, Tottori (JP)

(72) Inventors: Eiki Fujiwara, Tottori (JP); Kuniyasu Enoki, Tottori (JP); Yoichi Murata, Tottori (JP)

(73) Assignee: NIPPON CERAMIC CO., LTD., Tottori (JP)

( * ) Notice: Subject to any disclaimer, the term of this patent is extended or adjusted under 35 U.S.C. 154(b) by 0 days.

(21) Appl. No.: 17/779,886

(22) PCT Filed: Nov. 24, 2020

(86) PCT No.: PCT/JP2020/043662
§ 371 (c)(1),
(2) Date: May 25, 2022

(87) PCT Pub. No.: WO2021/106866
PCT Pub. Date: Jun. 3, 2021

(65) Prior Publication Data
US 2022/0412796 A1    Dec. 29, 2022

(30) Foreign Application Priority Data

Nov. 26, 2019  (JP) .................................. 2019-213010

(51) Int. Cl.
*G01J 1/44*   (2006.01)
*G01J 5/02*   (2022.01)

(52) U.S. Cl.
CPC .................. *G01J 1/44* (2013.01); *G01J 5/025* (2013.01)

(58) Field of Classification Search
CPC ...... G01J 1/44; G01J 5/025; G01J 5/35; G01J 1/02
See application file for complete search history.

(56) References Cited

U.S. PATENT DOCUMENTS 8,309,927 B2 *  11/2012  Kimura ..................... G01J 1/46
                                                        250/338.3
9,212,951 B2 *  12/2015  Fukui ........................ G01J 5/34

FOREIGN PATENT DOCUMENTS

JP    H10-318834 A    12/1998
JP    H10-320684 A    12/1998
(Continued)

OTHER PUBLICATIONS

International Searching Authority, "International Search Report," issued in connection with International Patent Application No. PCT/JP2020/043662, dated Feb. 2, 2021.
(Continued)

*Primary Examiner* — Seung C Sohn
(74) *Attorney, Agent, or Firm* — Foley & Lardner LLP

(57) ABSTRACT

In a pyroelectric infrared detector in which a pyroelectric element and an integrated circuit performing processing of a detection signal from the pyroelectric element are housed in a package, the integrated circuit includes: a converter that performs analog-to-digital conversion of the detection signal; a signal processor that performs signal processing by a digital filter for the detection signal after the conversion; and an input-output controller that delivers the output data from the signal processor to an external device via serial data communication. A cut-off frequency of the digital filter is settable and changeable by voltage application to the integrated circuit or by a command supplied from the external device via the serial data communication.

17 Claims, 3 Drawing Sheets

(56) References Cited

FOREIGN PATENT DOCUMENTS

| | | | |
|---|---|---|---|
| JP | 2005-308617 | A | 11/2005 |
| JP | 2010-169548 | A | 8/2010 |
| JP | 2011-208480 | A | 10/2011 |
| JP | 2012-225763 | A | 11/2012 |
| JP | 2013-104827 | A | 5/2013 |
| JP | 2013-524178 | A | 6/2013 |
| JP | 2016-070694 | A | 5/2016 |
| JP | 2016-186478 | A | 10/2016 |
| JP | 2017-058331 | A | 3/2017 |

OTHER PUBLICATIONS

International Searching Authority, "Written Opinion," issued in connection with International Patent Application No. PCT/JP2020/043662, dated Feb. 2, 2021.

\* cited by examiner

PYROELECTRIC-TYPE INFRARED DETECTOR AND INTEGRATED CIRCUIT

CROSS-REFERENCE TO RELATED APPLICATIONS

The present application claims priority under 37 U.S.C. § 371 to International Patent Application No. PCT/JP2020/043662, filed Nov. 24, 2020, which claims priority to and the benefit of Japanese Patent Application No. 2019-213010, filed on Nov. 26, 2019. The contents of these applications are hereby incorporated by reference in their entireties.

TECHNICAL FIELD

The present invention relates to detection of infrared (IR), and in particular, to a pyroelectric infrared detector incorporating an integrated circuit (IC) therein, and the integrated circuit.

BACKGROUND ART

In recent years, wireless communication function has been installed in various electronic apparatuses due to development of a wireless communication technologies. Further, apparatuses provided with wireless communication function and allowed to be miniaturized and battery-driven have been remarkably spread. In such an electronic apparatus, a pyroelectric infrared detector is often installed so that, for power saving, the electronic apparatus can be driven only in a time when a person or an animal to be detected by the electronic apparatus is present. A pyroelectric infrared detector is a device in which a pyroelectric element is arranged inside a package equipped with a window for transmitting infrared rays. The pyroelectric infrared detector installed in such an electronic apparatus is often incorporated with a built-in integrated circuit, as disclosed in Patent Literatures 1 to 4.

By incorporating an integrated circuit, it is possible to achieve miniaturization of the electronic apparatus equipped with a pyroelectric infrared detector, and further, a signal processing circuit is arranged inside the pyroelectric infrared detector constituted of a metal package thereby enabling reduction of the influence of external electromagnetic noise. Pyroelectric infrared detectors with built-in integrated circuits are used in a variety of apparatuses and systems besides apparatus with wireless communication function.

Of the integrated circuits incorporated in the pyroelectric infrared detectors, there is a type including: for example, a converter performing analog-to-digital conversion of the detection signal obtained from the pyroelectric element; and a signal processor performing noise rejection and signal processing on the detection signal converted into a digital signal. The noise rejection is performed, for example, by digital filtering using a certain cut-off frequency. Another type of the integrated circuit includes: an amplifier amplifying the detection signal obtained from the pyroelectric element with a constant amplification gain; and a converter performing analog-to-digital conversion of the detected signal after amplification. The integrated circuit performs noise rejection processing and calculation in accordance with a fixed rule to the detection signal converted into the digital signal, and then delivers the result to the outside.

As the output form of the integrated circuit, there is one in which the detection signal is converted to a digital signal and then signal-processed, a constant detection determination threshold is applied to the converted and signal-processed detection signal to determined whether or not an object to be detected such as a human body or an animal is detected, and then only information of detected or non-detected is delivered by a binary signal. Alternatively, there is another form in which the detection signal that has been converted to a digital signal and signal-processed is delivered in accordance with an interface standard unique to the manufacturer of the pyroelectric infrared detector. By adopting these output forms, the external device to which the pyroelectric infrared detector is connected can receive and utilize the detection signal of in a digital form without providing an analog circuit for processing the detection signal.

CITATION LIST

Patent Literature

Patent Literature 1: JP 2012-225763A
Patent Literature 2: JP 2013-524178A
Patent Literature 3: JP 2016-70694A
Patent Literature 4: JP 2016-186478A

SUMMARY OF THE INVENTION

Technical Problem

In the pyroelectric infrared detector, it is necessary to perform filtering processing for the detection signal which is based on the output of the pyroelectric element, and to take out only signal components by the object to be detected. Pyroelectric infrared detectors target various objects such as human bodies, animals, machines or flames having different moving velocities and radiating infrared wavelengths. Therefore, in order to extract only signal components by an object to be detected, it is necessary to set an appropriate cut-off frequency in the filtering processing according to the object to be detected and use application. However, the conventional digital-output-type pyroelectric infrared detectors have a fixed cut-off frequency, which may not be usable for some applications. In addition, in case of the conventional digital-output-type pyroelectric infrared detectors, when a plurality of pyroelectric infrared detectors are connected to an external device including an external integrated circuit, it is necessary to individually provide an input-output (I/O) port corresponding to each one of the pyroelectric infrared detectors.

The object of the present invention is to provide: a pyroelectric infrared detector that can cope with various objects to be detected and various applications and that can prevent an increase in the number of input-output terminals in an external device that is a connection destination even when a plurality of the pyroelectric infrared detectors are used; and an integrated circuit that can be used in such a pyroelectric infrared detector.

Solution to Problem

The pyroelectric infrared detector according to the present invention includes: a package; one or more pyroelectric elements housed in the package; and an integrated circuit that is housed in the package and that performs processing of a detection signal based on an output of the pyroelectric element, the pyroelectric infrared detector characterized in that the integrated circuit comprises: a converter that performs analog-to-digital conversion of the detection signal; a signal processor that performs signal processing by a digital filter for the detection signal converted into a digital signal; and an input-output controller that delivers output data from the signal processor to an external device via serial data communication, and a cut-off frequency of the digital filter is settable and changeable by voltage application to the integrated circuit or by a command supplied from the external device via the serial data communication.

The integrated circuit according to the present invention is an integrated circuit that performs inputting and signal processing of a detection signal based on an output of a pyroelectric infrared detector, characterized in that the integrated circuit comprises: a convertor that performs analog-to-digital conversion of the detection signal; a signal processor that performs signal processing by a digital filter for the detected signal converted into a digital signal; and an input-output controller that delivers output data from the signal processor to an external device via serial data communication, and a cut-off frequency of the digital filter is settable and changeable by voltage application to the integrated circuit or by a command supplied from the external device via the serial data communication.

Advantageous Effects of Invention

In the present invention, since the cut-off frequency in the digital filter can be set and changed by voltage application to the integrated circuit or by a command supplied from an external device via the serial data communication, it becomes possible to adapt a single pyroelectric infrared detector to various objects to be detected and various applications. Since the pyroelectric infrared detector can communicate with an external device via serial data communication, it is possible to prevent an increase in the number of input-output terminals in an external device, which is a connection destination, by using a technique capable of connecting a plurality of devices to a single bus line generally used in serial data communication, even when a plurality of pyroelectric infrared detectors are used.

DESCRIPTION OF EMBODIMENTS

First Embodiment

Figure 1:
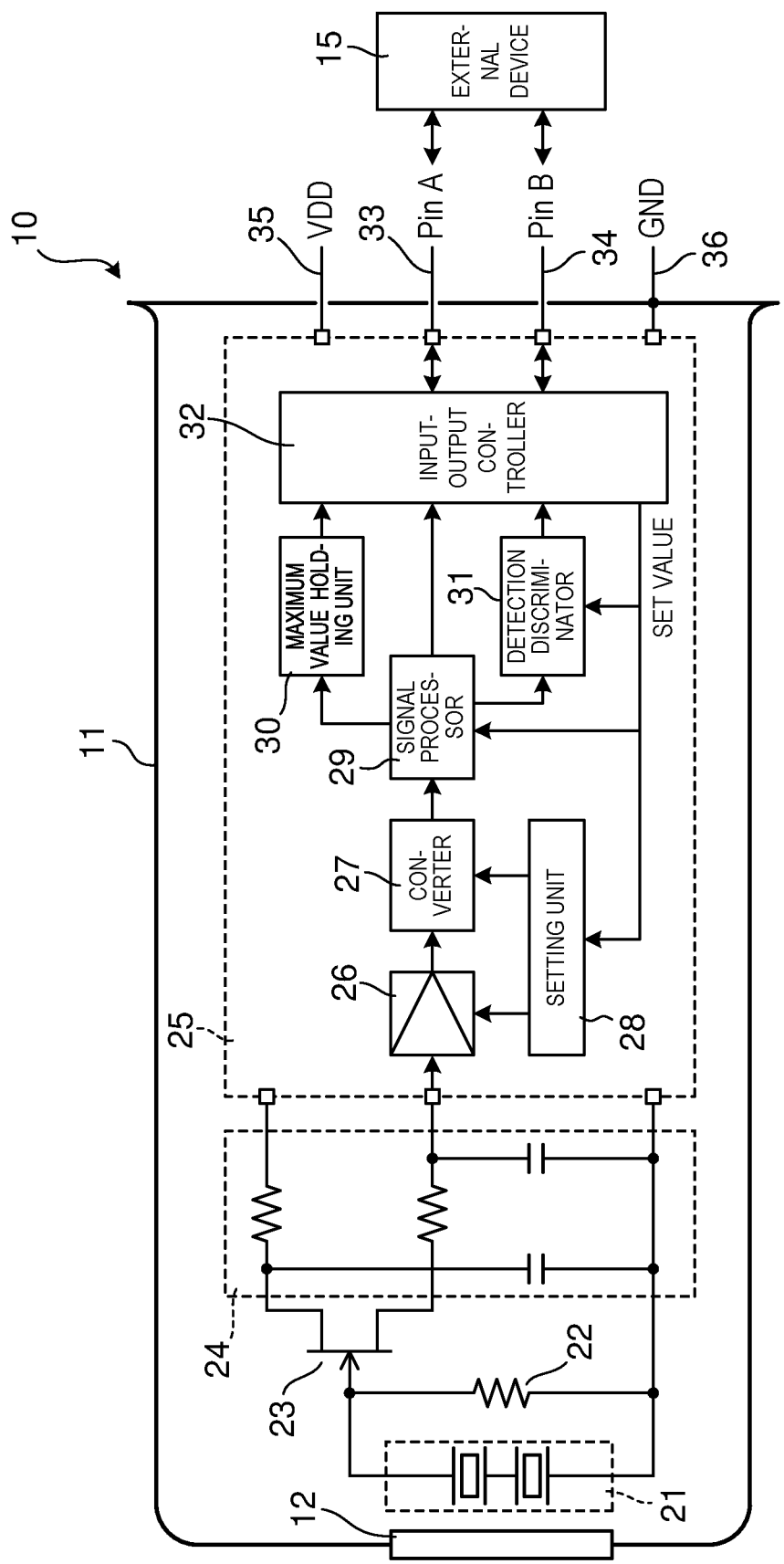
FIG. 1 is a diagram showing a configuration of a pyroelectric infrared detector according to a first embodiment.

Next, embodiments of the present invention will be described with reference to the drawings. FIG. 1 shows an internal configuration of a pyroelectric infrared detector according to a first embodiment of the present invention. This pyroelectric infrared detector 10 is used for detecting an object to be detected and delivering the detection result to external device 15. External device 15 is provided outside pyroelectric infrared detector 10, and is, for example, an integrated circuit or various apparatuses.

Pyroelectric infrared detector 10 is a device in which one or a plurality of pyroelectric elements 21 and integrated circuit 25 for processing the detection signal obtained from pyroelectric element 21 are airtightly housed in package 11 made of, for example, metal. Window 12 for transmitting infrared rays to the inside of package 11 is formed in package 11. Pyroelectric element 21 is disposed so as to receive infrared rays transmitted through window 12. In the illustrated example, one pyroelectric element 21 is provided. Resistor 22 having a high resistance value is connected in parallel to pyroelectric element 21. Further, impedance converting element 23 is connected at one end of pyroelectric element 21, and filter circuit 24 which is an analog low-pass filter for reducing high frequency noise is provided is between impedance converting element 23 and integrated circuit 25. In the illustrated example, a source follower circuit by a field effect transistor is used as the impedance converting element.

Integrated circuit 25 includes: amplifier 26 that amplifies the detection signal which is supplied from pyroelectric element 21 through impedance converting element 23 and filter circuit 24; convertor 27 that performs analog-to-digital conversion on the detection signal after the amplification; signal processor 29 that performs digital filtering on the detection signal converted into a digital signal; and input-output controller 32 that delivers the output data from signal processor 29 toward external device 15 via serial data communication. In the illustrated example, two input-output terminals 33 and 34, called "Pin A" and "Pin B," for serial data communication are provided in the pyroelectric infrared detector 10. Input-output terminals 33 and 34 are both connected to input-output controller 32. When the detection signal delivered from pyroelectric element 21 is sufficiently large or when a ΔΣ type converter is used for the analog-to-digital conversion, amplifier 26 is not necessarily provided. Further, pyroelectric infrared detector 10 is provided with: a power supply terminal 35 that supplies power supply voltage VDD to integrated circuit 25; and ground terminal 36 that connects integrated circuit 25 to ground potential GND and is electrically connected to package 11.

Here, the serial data communication used for connection to external device 15 will be described. As a communication scheme of serial data communication in the present invention, various kinds of schemes such as synchronous serial data communication and asynchronous serial data communication can be used, but a communication scheme capable of connecting a plurality of slave devices to a bus line used for serial data communication is preferably used. As an example of such a scheme, there is I2C (Inter-Integrated Circuit) system. "I2C" may also be referred to as "I$^2$C." When the I2C system is used, external device 15 is used as a master device, pyroelectric infrared detector 10 is used as a slave device, one of input-output terminals 33 and 34 is used as a terminal for bidirectional serial transfer of data, and the other is used as a terminal for receiving a serial clock (SCL) from the master device. Other than the I2C system, there is a scheme in which one of input-output terminals 33 and 34 is used for serial data communication, and the other is used for transmission of a trigger signal or an interruption signal from pyroelectric infrared detector 10 to external device 15.

The digital filtering processing in signal processor 29 is intended to extract only the components of the object to be detected from the detection signal of the pyroelectric element 21. External electromagnetic noise and sudden noise due to an abrupt change of environmental temperature is also eliminated by this digital filtering process. Various objects such as a human body, an animal, a machine or a flame are considered as an object to be detected of pyroelectric infrared detector 10, and these objects are different in moving speed and wavelength of radiating infrared rays. The object to be detected may not be properly detected without setting or changing of the cut-off frequency of the digital filtering processing in accordance with the use application of pyroelectric infrared detector 10. Therefore, pyroelectric infrared detector 10 according to the present embodiment is configured so that the cut-off frequency in the digital filtering processing can be set and changed by voltage application to an adjustment input pin (not shown) provided in integrated circuit 25, or by a command to be supplied to input-output controller 32 via serial data communication from external device 15. When the cut-off frequency is set and changed by applying voltage to integrated circuit 25, it may be configured so that the cut-off frequency can be set and changed in several stages depending on the applied voltage. When the serial data communication scheme is the I2C system, it is easy to transmit and receive commands for setting and changing the cut-off frequency, and it is possible to set arbitrary cut-off frequency characteristics based on the command. In the example shown in FIG. 1, the command sent by the serial data communication of the I2C system is converted into a set value in input-output controller 32, and then the set value is supplied to signal processor 29.

Figure 2:
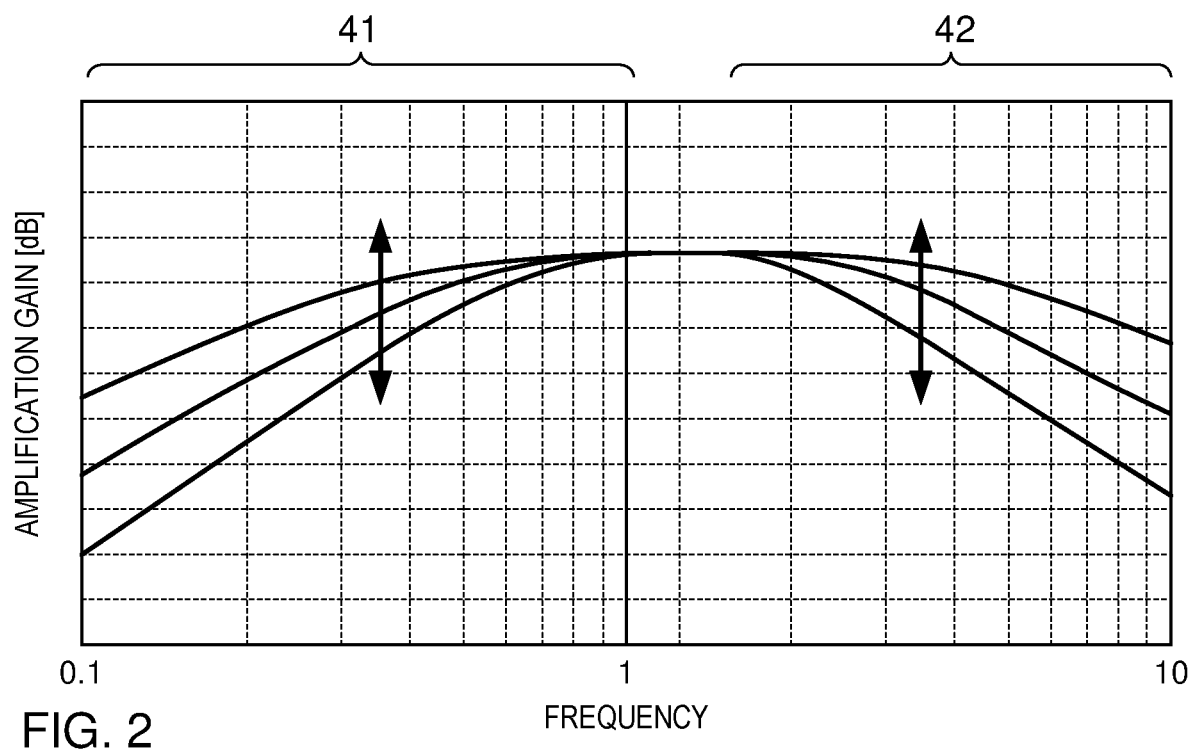
FIG. 2 is a graph showing an example of frequency characteristics in digital filtering processing.

FIG. 2 shows an example of the frequency characteristics of the digital filter realized by signal processor 29. As shown, it is preferable that cut-off characteristics 41 in the lower frequency side and cut-off characteristics 42 in the higher frequency side can be independently set and changed. By individually setting cut-off characteristics 41 in the lower frequency side and cut-off characteristic 42 in the higher frequency side in accordance with the application of pyroelectric infrared detector 10, it is possible to improve the performance of detecting the object to be detected and suppress false alarms due to detection of an object that is not the object to be detected.

In pyroelectric infrared detector 10, the level of the detection signal generated when pyroelectric element 21 receives infrared rays is largely different by the shape of a light receiving electrode provided in pyroelectric element 21 and the energy amount of the received infrared rays. Therefore, when the dynamic range of the analog-to-digital conversion in convertor 27 is too wide as compared with the level of the detection signal, the resolution in the analog-to-digital conversion is effectively reduced. This results in a decrease in detection performance when attempting detection of minute movement with little change in the infrared energy amount or when detecting an object to be detected at an environmental temperature equivalent to the surface temperature of the object to be detected. In order to improve the detection performance, it is necessary that the dynamic range in the analog-to-digital conversion matched the level of the detection signal and the amount of change thereof. Therefore, in pyroelectric infrared detector 10 according to the present embodiment, it is preferable that at least one of the amplification gain of the detection signal in amplifier 26 and the dynamic range of the analog-to-digital conversion by converter 27 can be changed by voltage application to an adjustment input pin (not shown) provided in integrated circuit 25 or by a command supplied to input-output controller 32 via serial data communication from external device 15. In the device shown in FIG. 1, the command sent by the serial data communication of the I2C system is converted into a set value in input-output controller 32. Integrated circuit 25 is provided with setting unit 28 for actually setting and changing the amplification gain of amplifier 26 and the dynamic range of converter 27, on the basis of the set value.

By making at least one of the amplification gain of amplifier 26 and the dynamic range of converter 27 variable and adjustable, the resolution of the analog-to-digital conversion does not become insufficient for the detection signal even when the infrared energy incident on pyroelectric element 21 is small or even when the movement of the object to be detected is minute, and the detection signal can be converted into a digital signal without impairing the detection resolution regardless of the magnitude of the detection signal. Thus, the detection performance can be maintained or improved, and high fine-movement detection performance for the object to be detected can be obtained.

When using the I2C system as a communication scheme of serial data communication, external device 15 becomes a master device and pyroelectric infrared detector 10 becomes a slave device, external device 15 sends a data request to pyroelectric infrared detector 10, and, in response to the data request, integrated circuit 25 of pyroelectric infrared detector 10 transmits the detection data to external device 15. Since an interval of the data request is determined by software or the like executed by external device 15, the transmission of the detection signal by an object to be detected to the side of external device 15 may fail when the data request interval is too long. When pyroelectric infrared detector 10 is installed in a battery-driven device, it is effective for power saving to reduce frequency of data request from an external integrated circuit, which is external device 15, to pyroelectric infrared detector 10. However, by reducing the frequency of data request, it is possible to overlook a detection signal to be originally required, that is, there is a possibility of lost of alarm. The power saving and the lost of alarm are in a trade-off relationship. Therefore, it is preferable that integrated circuit 25 is provided with maximum value holding unit 30 for holding the maximum swing width of the detection signal processed by signal processor 29 in a period in which there is no data request, and the swing direction of the detection signal at that time.

Figure 3:
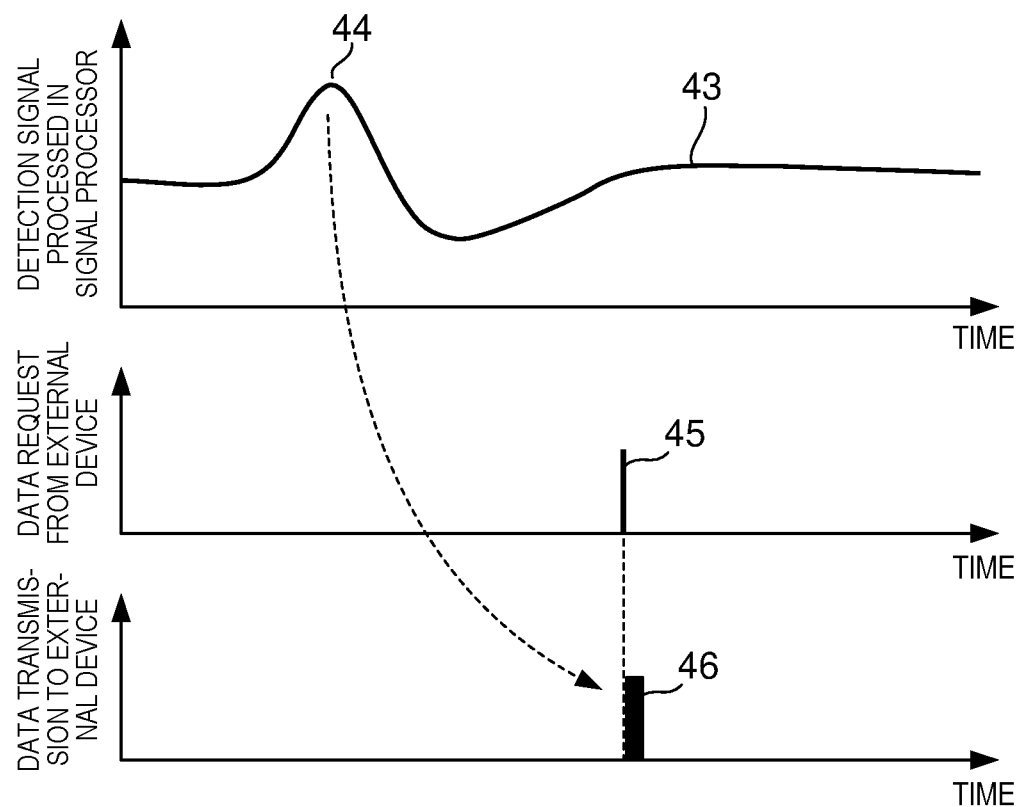
FIG. 3 is a timing diagram for explaining an operation of a maximum value holding unit.

FIG. 3 describes the operation of maximum value holding unit 30. Although the time change of detection signal 43 processed by the signal processor is indicated here by a graph, detection signal 43 is actually in the form of time-varying digital data. Maximum value 44 in detection signal 43 is held in maximum value holding unit 30. When data request 45 from external device 15 is supplied, the transmission of maximum value data 46 to external device 15 is carried out at the timing of data request 45. By providing maximum value holding unit 30 that holds the maximum value of the detection signal in this way, it is possible to confirm the maximum value of the detection signal due to the detection of the object to be detected even when the interval of the data request from external device 15 is long, and it is possible to save power and prevent the loss of alarm. Here, maximum value holding unit 30 holds maximum value 44 at the time that the detection signal is changed on a positive direction, that is, the detection signal swings in the positive direction. Since detection signal 43 may be changed in the negative direction when the object to be detected is detected, the maximum swing width in the positive direction or the maximum swing width in the negative direction of the detection signal is processed to an absolute value, and then the absolute value and the swing direction of the direction signal at that time are held in maximum value holding unit 30.

Regarding the power saving of the apparatus in which pyroelectric infrared detector 10 is installed, it is effective to leave the apparatus in a resting state at normal time and operate the apparatus only when pyroelectric infrared detector 10 has determined that the object to be detected is detected. To realize such an operation, it is preferable that integrated circuit 25 is provided with detection discriminator 31 that compares the detection signal processed by signal processor 29 with a threshold value to perform detection determination of the object to be detected. Detection discriminator 31 delivers a trigger signal or an interruption signal to external device 15 via the input-output controller 32 when detection discriminator 31 determines that the object to be detected has been detected.

Figure 4:
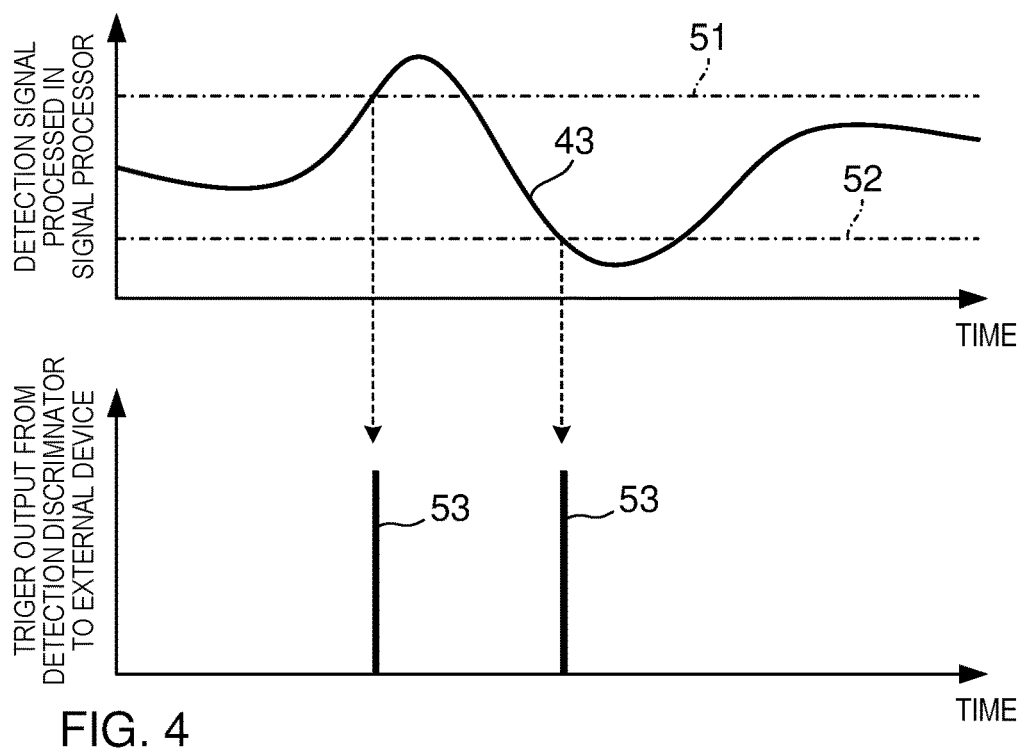
FIG. 4 is a timing diagram for explaining an operation of a detection discriminator.

FIG. 4 is a diagram for explaining the operation of detection discriminator 31. The detection signal from pyroelectric element 21 may change not only in the positive direction but also in the negative direction depending on the movement direction of object to be detected. Therefore, in detection discriminator 31, upper limit side threshold value 51 and lower limit side threshold value 52 are set for detection signal 43 processed by signal processor 29. Detection discriminator 31 compares detection signal 43 with threshold values 51 and 52, and delivers trigger signal 53 or the interruption signal when detection signal 43 exceeds upper limit side threshold value 51 or falls below lower limit side threshold value 52. It is preferable that the threshold values 51 and 52 can be changed by voltage application to an adjustment input pin (not shown) provided in integrated circuit 25 or by a command supplied to input-output controller 32 from external device 15 by serial data communication. If external device 15 to which pyroelectric infrared detector 10 is connected is an integrated circuit or the like serving as a connection interface with pyroelectric infrared detector 10 in an apparatus in which pyroelectric infrared detector 10 is installed, it is possible to resume the apparatus from the resting state to operate only when the trigger signal or the interruption signal from detection discriminator 31 is present. The power saving of the apparatus in which pyroelectric infrared detector 10 is installed can be thus achieved. When integrated circuit 25 is equipped with maximum value holding unit 30, external device 15 which has resumed from the resting state by the trigger signal or the interruption signal can send a data request to pyroelectric infrared detector 10 and obtain the absolute value of the maximum swing width and the swing direction of the detection signal which are stored in maximum value holding unit 30.

Second Embodiment

Figure 5:
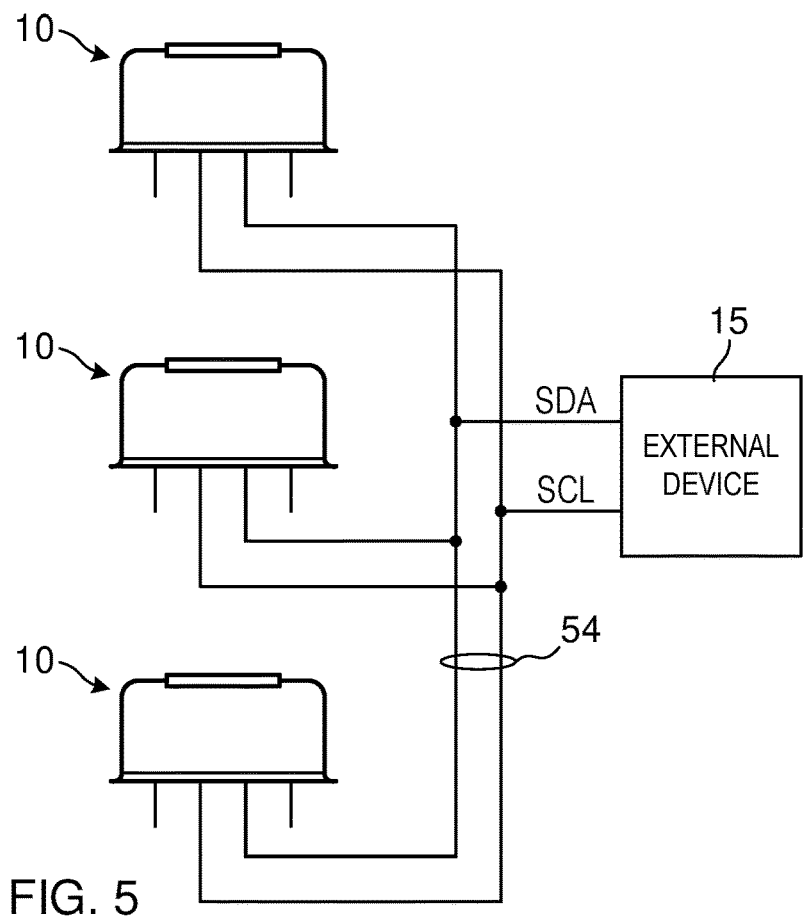
FIG. 5 is a diagram illustrating a connection of a plurality of pyroelectric infrared detectors in the second embodiment.

Since pyroelectric infrared detector 10 according to the first embodiment can be connected to external device 15 by a bus line of serial data communication, a plurality of pyroelectric infrared detectors 10 can be connected to one external device 15. FIG. 5 shows an example in which a plurality of pyroelectric infrared detectors 10 according to first embodiment are connected to one external device 15. Here, it is assumed that the I2C system is used as a communication scheme of serial data communication. In the illustrated example, one external device 15 which is a master device is connected to bus line 54 of the I2C system, and three pyroelectric infrared detectors 10, which are slave devices, are connected the bus line. Bus line 54 is composed of a signal line of serial data (SDA) and a signal line of a serial clock (SCL). An unique access address is assigned to each pyroelectric infrared detector 10 according to the I2C standard. In order to facilitate individual identification when pyroelectric infrared detector 10 is installed, the access address of pyroelectric infrared detector 10 is printed or marked on the package 11 of pyroelectric infrared detector 10 so as to be visible. The number of pyroelectric infrared detectors 10 which can be simultaneously connected to bus line 54 is not limited to 3, and more pyroelectric infrared detectors 10 can be connected to bus line 54. By using the access address of pyroelectric infrared detector 10 stored in advance, external device 15 can perform individual identification of the pyroelectric infrared detector 10 connected to bus line 54 to access the desired pyroelectric infrared detector 10.

Even when the I2C system is used as the communication scheme of serial data communication, external device 15 can receive the trigger signal or the interruption signal via bus line 54 at the time when any of pyroelectric infrared detector 10 connected to bus line 54 detects an object to be detected. External device 15 can send data request 45 to each pyroelectric infrared detector 10 in a manner that the access addresses are scanned to acquire the data held in maximum value holding unit 30 of each pyroelectric infrared detector 10.

According to the second embodiment, in each pyroelectric infrared detector 10, it is possible to perform removal of external electromagnetic noise or the like without impairing the quality of the detection signal from pyroelectric element 21 and to perform processing of the detection signal in accordance with application. A plurality of pyroelectric infrared detectors 10 can be connected to the same bus line 54. Therefore, an inexpensive component with reduced number of input-output terminals, that is, pins, for connection with pyroelectric infrared detectors 10 can be used as external device 15.

REFERENCE SIGNS LIST

10 Pyroelectric infrared detector;
11 Package;
12 Window;
15 External device;
21 Pyroelectric element;
23 Impedance converting element;
25 Integrated circuit;
26 Amplifier;
27 Converter;
28 Setting unit;
29 Signal Processor;
30 Maximum value holding unit;
31 Detection discriminator; and
32 Input-output controller.

The invention claimed is:

1. A pyroelectric infrared detector that includes: a package; one or more pyroelectric elements housed in the package; and an integrated circuit that is housed in the package and that performs processing of a detection signal based on an output of the pyroelectric element, the pyroelectric infrared detector characterized in that:

the integrated circuit comprises:
a converter that performs analog-to-digital conversion of the detection signal;
a signal processor that performs signal processing by a digital filter for the detection signal converted into a digital signal; and
an input-output controller that delivers output data from the signal processor to an external device via serial data communication, and a cut-off frequency of the digital filter is settable and changeable by voltage application to the integrated circuit or by a command supplied from the external device via the serial data communication.

2. The pyroelectric infrared detector according to claim 1, wherein the cut-off frequency of the digital filter on a high frequency side and the cut-off frequency of the digital filter on a low frequency side are individually settable.

3. The pyroelectric infrared detector according to claim 2, wherein a dynamic range of the analog-to-digital conversion in the convertor is changeable by voltage application to the integrated circuit or by a command supplied from the external device via the serial data communication.

4. The pyroelectric infrared detector according to claim 3, wherein the integrated circuit includes an amplifier that is provided in a front stage of the converter and that amplifies the detection signal, and
wherein an amplification gain of the amplifier is changeable by voltage application to the integrated circuit or by a command supplied from the external device via the serial data communication.

5. The pyroelectric infrared detector according to claim 3, wherein the integrated circuit includes a maximum value holding unit that holds an absolute value of a maximum swing amplitude of the detection signal processed by the signal processor and a swing direction of the detection signal corresponding to the absolute value, and
wherein the integrated circuit transmits, in response to a data request from the external device, a current value of the detection signal and the maximum value held in the maximum value holding unit to the external device.

6. The pyroelectric infrared detector according to claim 2, wherein the integrated circuit includes an amplifier that is provided in a front stage of the converter and that amplifies the detection signal, and
wherein an amplification gain of the amplifier is changeable by voltage application to the integrated circuit or by a command supplied from the external device via the serial data communication.

7. The pyroelectric infrared detector according to claim 2, wherein the integrated circuit includes a maximum value holding unit that holds an absolute value of a maximum swing amplitude of the detection signal processed by the signal processor and a swing direction of the detection signal corresponding to the absolute value, and
wherein the integrated circuit transmits, in response to a data request from the external device, a current value of the detection signal and the maximum value held in the maximum value holding unit to the external device.

8. The pyroelectric infrared detector according to claim 1, wherein a dynamic range of the analog-to-digital conversion in the convertor is changeable by voltage application to the integrated circuit or by a command supplied from the external device via the serial data communication.

9. The pyroelectric infrared detector according to claim 8, wherein the integrated circuit includes an amplifier that is provided in a front stage of the converter and that amplifies the detection signal, and
wherein an amplification gain of the amplifier is changeable by voltage application to the integrated circuit or by a command supplied from the external device via the serial data communication.

10. The pyroelectric infrared detector according to claim 8, wherein the integrated circuit includes a maximum value holding unit that holds an absolute value of a maximum swing amplitude of the detection signal processed by the signal processor and a swing direction of the detection signal corresponding to the absolute value, and
wherein the integrated circuit transmits, in response to a data request from the external device, a current value of the detection signal and the maximum value held in the maximum value holding unit to the external device.

11. The pyroelectric infrared detector according to claim 1, wherein the integrated circuit includes an amplifier that is provided in a front stage of the converter and that amplifies the detection signal, and
wherein an amplification gain of the amplifier is changeable by voltage application to the integrated circuit or by a command supplied from the external device via the serial data communication.

12. The pyroelectric infrared detector according to claim 1, wherein the integrated circuit includes a maximum value holding unit that holds an absolute value of a maximum swing amplitude of the detection signal processed by the signal processor and a swing direction of the detection signal corresponding to the absolute value, and
wherein the integrated circuit transmits, in response to a data request from the external device, a current value of the detection signal and the maximum value held in the maximum value holding unit to the external device.

13. The pyroelectric infrared detector according to claim 1, wherein the integrated circuit includes a detection discriminator that compares the detection signal processed by the signal processor with a threshold value to perform detection discrimination of an object to be detected, and delivers a trigger signal or an interruption signal to the external device according to a result of the detection discrimination, and
wherein the threshold value is changeable by voltage application to the integrated circuit or by a command supplied from the external device via the serial data communication.

14. The pyroelectric infrared detector according to claim 13, wherein the serial data communication is I2C-type serial data communication, and the trigger signal or the interrupt signal delivered by the detection discriminator is delivered to the external device using a single I2C bus line.

15. The pyroelectric infrared detector according to claim 1, wherein an access address for specifying the pyroelectric infrared detector in the serial data communication is set, and the access address is printed or stamped on the pyroelectric infrared detector so as to be visible.

16. The pyroelectric infrared detector according to claim 15, wherein the serial data communication is I2C-type serial data communication, and individual identification of the pyroelectric infrared detector is possible by the access address when a plurality of the pyroelectric infrared detectors are connected to a single I2C bus line.

17. An integrated circuit that performs inputting and signal processing of a detection signal based on an output of a pyroelectric infrared detector, characterized in that
the integrated circuit comprises:
a convertor that performs analog-to-digital conversion of the detection signal;
a signal processor that performs signal processing by a digital filter for the detected signal converted into a digital signal; and
an input-output controller that delivers output data from the signal processor to an external device via serial data communication, and
a cut-off frequency of the digital filter is settable and changeable by voltage application to the integrated circuit or by a command supplied from the external device via the serial data communication.

\* \* \* \* \*